United States Patent [19]
McIntosh

[11] Patent Number: 5,842,400
[45] Date of Patent: Dec. 1, 1998

US005842400A

[54] TABLE SAW ASSEMBLY

[75] Inventor: George A. McIntosh, Calgary, Canada

[73] Assignees: James B. Petersen; 679128 Alberta Ltd., both of Calgary, Canada

[21] Appl. No.: 500,256

[22] Filed: Jul. 10, 1995

[51] Int. Cl.[6] ................................................. B23D 19/00
[52] U.S. Cl. ......................... 83/477.2; 83/581; 83/471.3; 83/478
[58] Field of Search .................. 83/477.2, 574, 83/587, 471.3, 483, 478

[56] References Cited

U.S. PATENT DOCUMENTS

| | | | |
|---|---|---|---|
| 2,247,314 | 6/1941 | Sellmeyer | 83/477.2 |
| 4,184,394 | 1/1980 | Gjerde | 83/477.2 |
| 4,336,733 | 6/1982 | Macksoud | 83/477.2 |
| 4,465,114 | 8/1984 | Schumacher | 83/574 |
| 4,962,685 | 10/1990 | Hagstrom | 83/477.2 |

*Primary Examiner*—M. Rachuba
*Attorney, Agent, or Firm*—George A. Seaby

[57] ABSTRACT

In general, table saws can be used in a stationary mode only, i.e. the saw blade is fixed in one position. A relatively simple saw assembly which can be used with an ordinary circular saw includes a table with a slot in the top surface thereof for slidably receiving the blade of a saw mounted on a slide beneath the table. The slide is movably mounted on an arcuate track on a carriage for permitting tilting of the blade to make angled cuts. The saw is connected to the slide by a cantilever structure, which permits changing of the amount of blade projecting above the table top, i.e. raising and lowering of the saw to alter the depth of cut. The carriage is mounted on rails extending longitudinally of the table. A handle is connected to the saw and projects upwardly through the slot to a location above the and in front of the blade for manual movement of the carriage, the slide and the saw. The handle is releasably locked in the elevated use position, and can be released and rotated to a position completely beneath the table top. With the handle in the lower position, the carriage is locked in one position on the rails, and the saw is used in the same manner as a conventional table saw.

10 Claims, 7 Drawing Sheets

TABLE SAW ASSEMBLY

BACKGROUND OF THE INVENTION

FIELD OF THE INVENTION

This invention relates to a saw assembly and in particular to a table saw assembly which can be used in a stationary or in a sliding mode.

Woodworkers are required to utilize a variety of cutting implements in order to perform the different cutting operations required when working with wood and wood products, e.g. prefabricated wall panels. The cutting instruments in question include a table saw, hand held circular saws, radial arm saw and compound travelling miter saws. Each of the devices have advantages and limitations, and it can be quite costly to obtain a large collection of such devices. Obviously, a device which combines the advantages of two or more existing cutting implements in a single device would be useful and economical.

Examples of attempts to solve the above identified problems are disclosed in U.S. Pat. No. 2,599,893, issued to F. D. Butler on Jun. 10, 1952; U.S. Pat. No. 3,302,669, issued to Adolph Edler on Feb. 7, 1967; U.S. Pat. No. 3,841,189, issued to Joseph R. Wiater on Oct. 15, 1974 and U.S. Pat. No. 4,007,657 issued to Andrew Burch on Feb. 15, 1977. The Butler and Burch devices are useful only for straight or miter cutting small pieces of wood, because the frames of the devices constitute obstructions. The Edler device has more versatility; however, it too is limited by its frame structure. Moreover, the Edler device does not provide the safety and versatility of a table saw. The Wiater patent disclosed an invention which provides the benefits of a table saw and a travelling miter saw. However, a handle beneath the table top makes the device awkward and dangerous to operate.

SUMMARY OF THE INVENTION

The object of the present invention is to solve the above identified problems by providing a saw assembly for use with a saw, the table permitting use of the saw as a table saw or as a travelling miter saw, and which is operated with relative ease and safety.

Accordingly, the present invention relates to a table saw assembly for use with a circular saw comprising frame means; table top means on said frame means having a longitudinally extending slot therethrough; rail means extending longitudinally of said frame means beneath said table top means; carriage means longitudinally slidable on said rail means adapted to receive a saw, whereby a blade thereof extends upwardly through the slot in said table top means; stop means for fixing said carriage means on said rail means; control arm means for pivotal connection to the saw for movement between a first position in which said control arm means is completely beneath said table top means and the saw can be used as a table saw, when fixed in one position, and a second position in which said control arm extends through the slot in said table top means over top of the saw to a position above the blade for manually reciprocating the saw and carriage means.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENT

Figure 1:
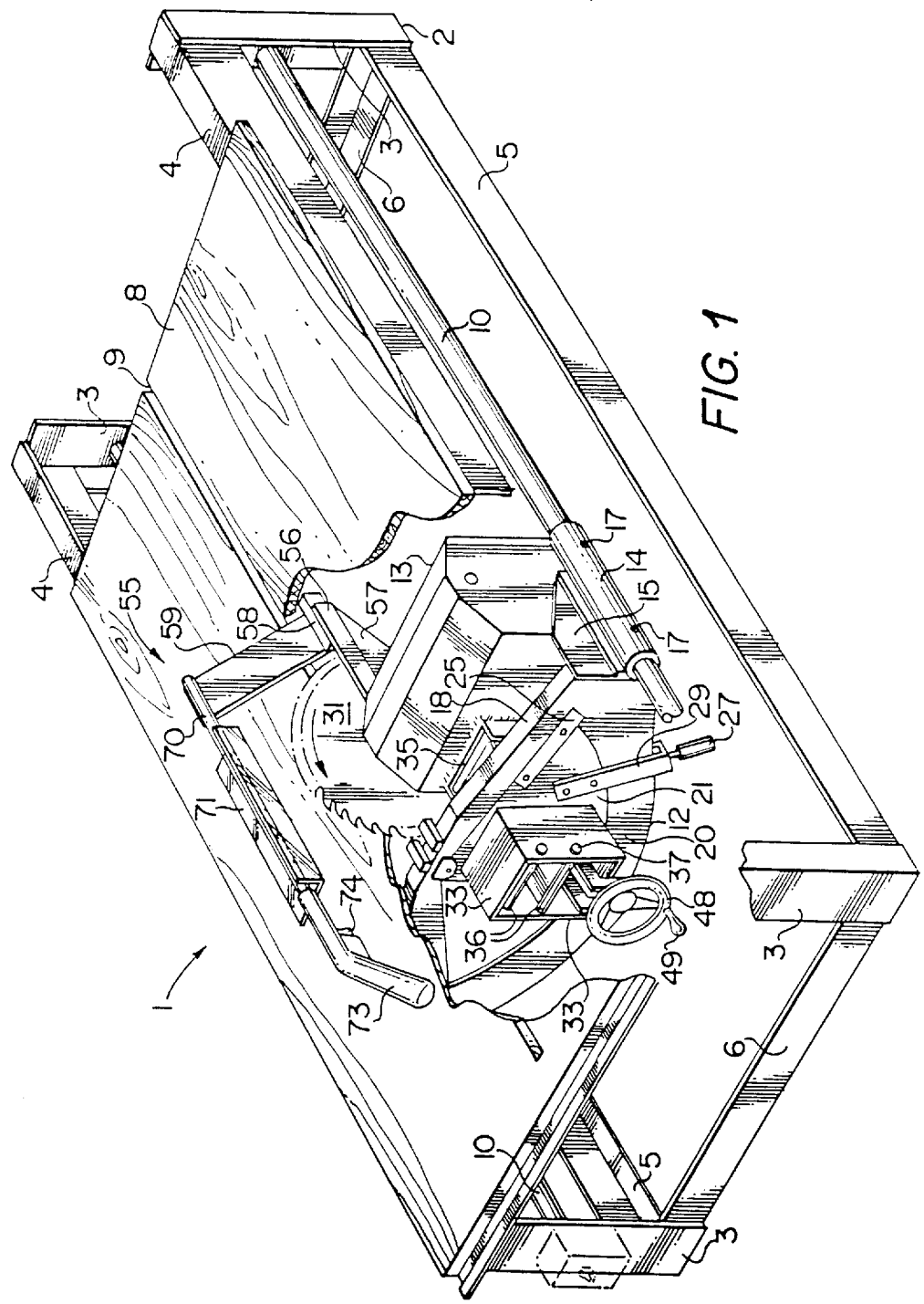
FIG. 1 is a partly sectioned, perspective view of a saw assembly in accordance with the present invention.
Figure 2:
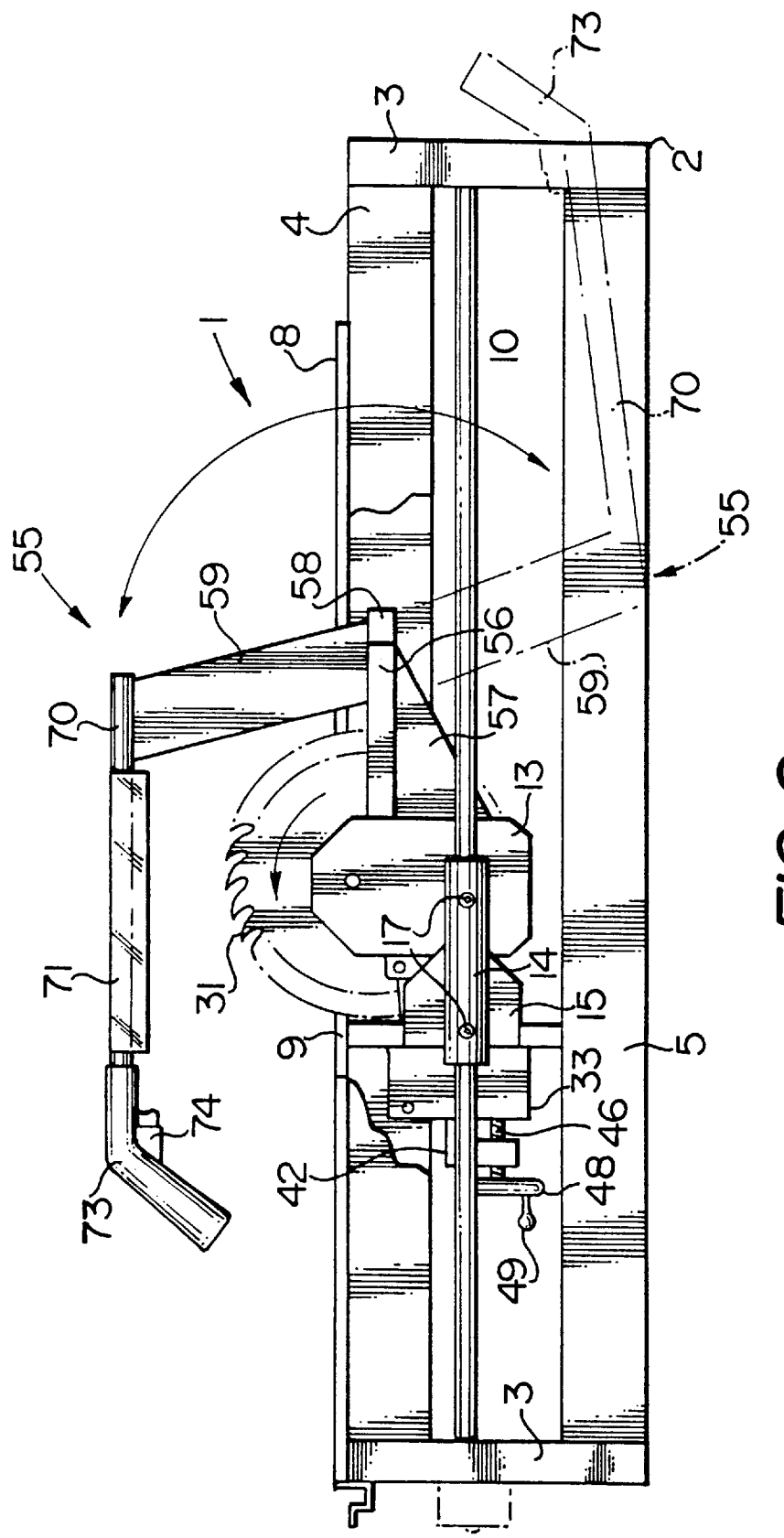
FIG. 2 is a partly sectioned side view of the saw assembly of FIG. 1.

With reference to FIGS. 1 and 2, the saw assembly of the present invention, which is generally indicated at 1, includes a table the base of which is defined by a frame 2 including four legs 3, longitudinally extending top and bottom bars 4 and 5, respectively, and cross braces 6. A table top is mounted on the frame 2. A slot 9 extends longitudinally through the top 8 along substantially the entire length thereof. A rail 10 extends longitudinally along each side of the frame 2 beneath the table top 8 between the legs 3.

A carriage 12 supporting a circular saw 13 is slidably mounted on the rails 10. The carriage, which extends transversely beneath the table top 8, includes cylindrical bushings 14 mounted on side plates 15 on each end thereof. The bushings 14 are slidably mounted on the rails 10 for moving the carriage 12 and the saw 13 longitudinally of the table top 8. Set screws 17 are provided in the bushings 14 for maintaining the latter in a fixed position on the rails 10.

The carriage 12 includes a top bar 18 and an arcuate bottom bar 20 extending between the side plates 15. The top and bottom bars 18 and 20 define a frame for receiving a slide 21. The slide 21 is in the form of a plate which is pivotally mounted for rotation around the axis of the pin 22 extending between small brackets 24 on the top center of the top bar 18 of the carriage 12. The slide 21 is maintained on the track defined by the bottom bar 20 by short metal bars 25, on each side of the slide 21. The slide 21 is manually moved along the track by a handle 27. The handle 27 is mounted on the bottom end of a rod 28. The top end (not shown) of the rod 28 is threaded, and extends through a generally U-shaped bracket 29 into engagement with the bottom edge of the track 20. The bracket 29 is connected to the slide 21. Thus, the handle 27 can be rotated around its longitudinal axis with the rod 28 to release the slide 21 for movement along the track 20. When the slide 21 is in the desired position, the handle 27 and the rod 28 are again rotated to lock the slide in a fixed position.

Figure 3:
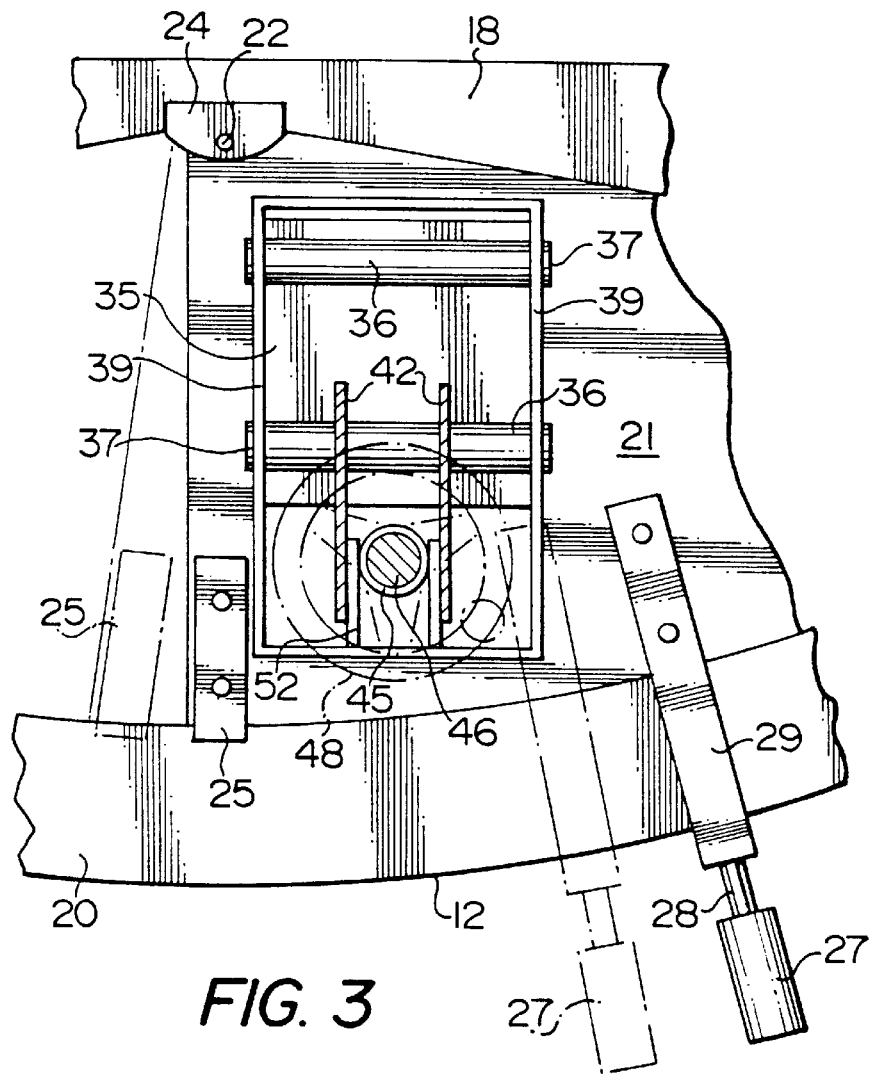
FIG. 3 is a front view of a portion of a carriage used in the saw assembly of FIGS. 1 and 2.
Figure 4:
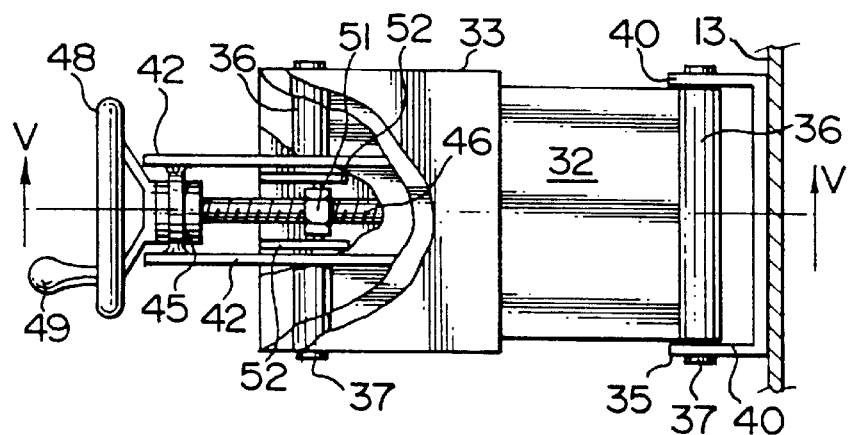
FIG. 4 is a partly sectioned plan view of the center of the portion of the carriage of FIG. 3.
Figure 5:
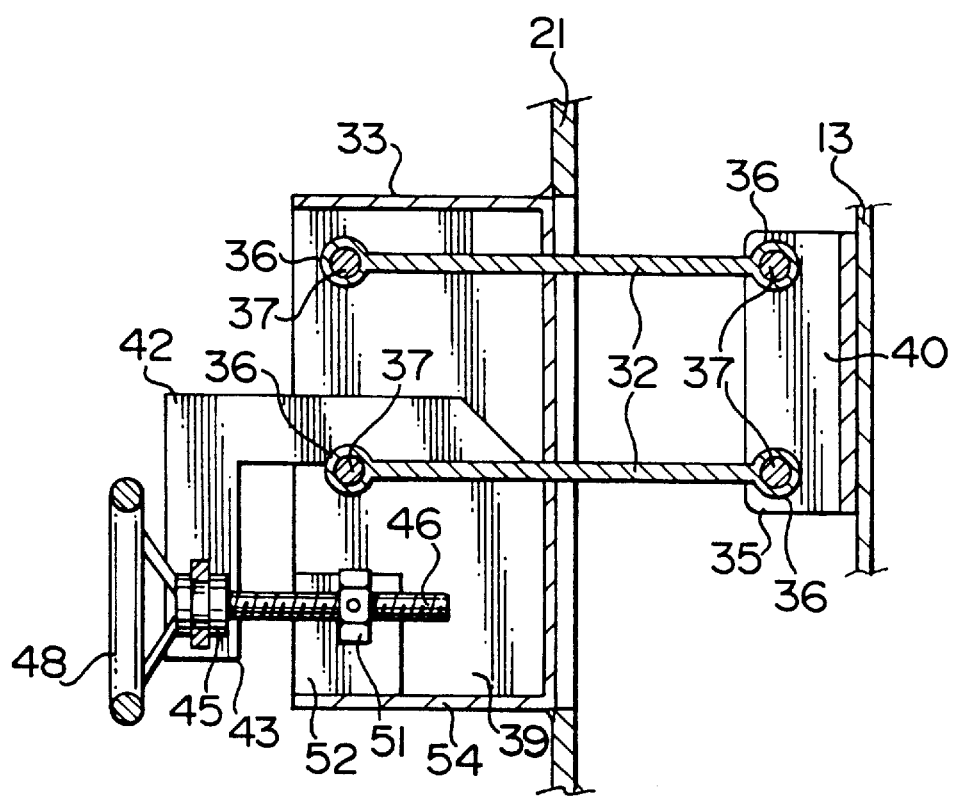
FIG. 5 is a cross section taken generally along line V—V of FIG. 4.
Figure 6:
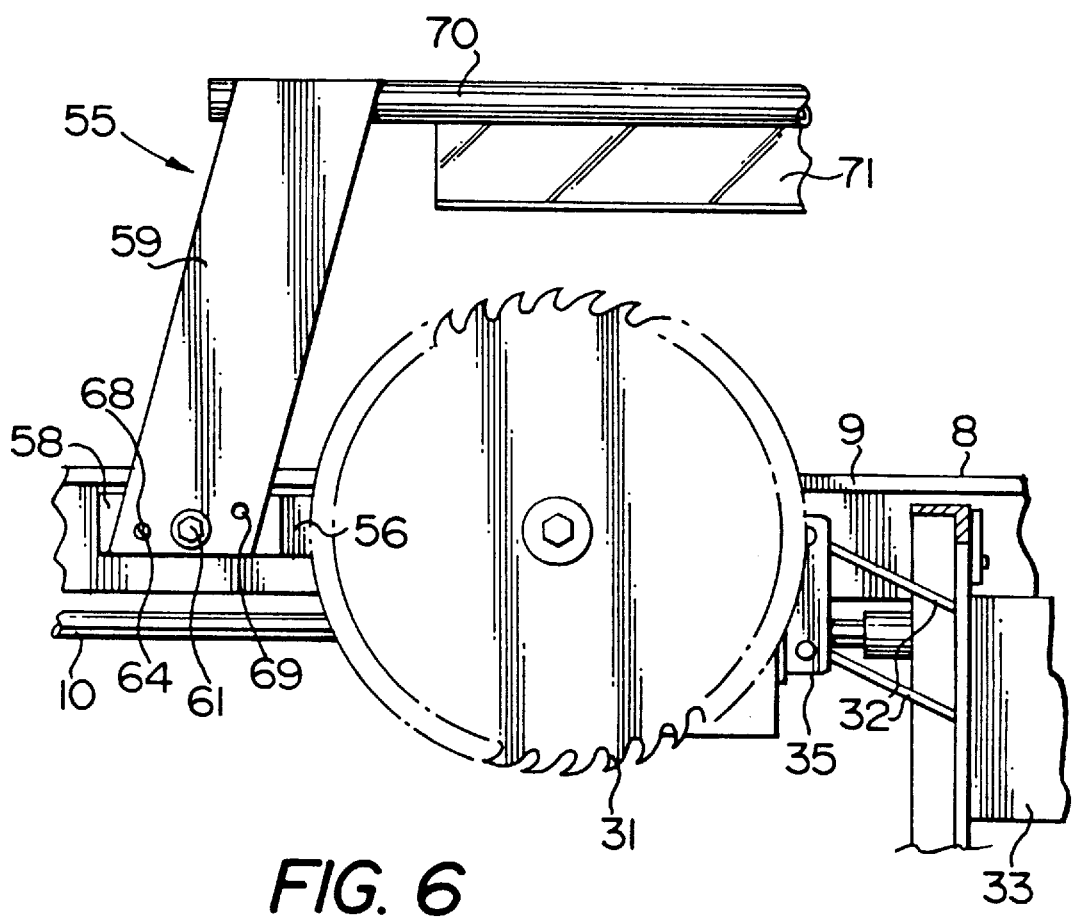
FIG. 6 is a side view of a portion of a handle assembly used in the saw of FIGS. 1 and 2.
Figure 7:
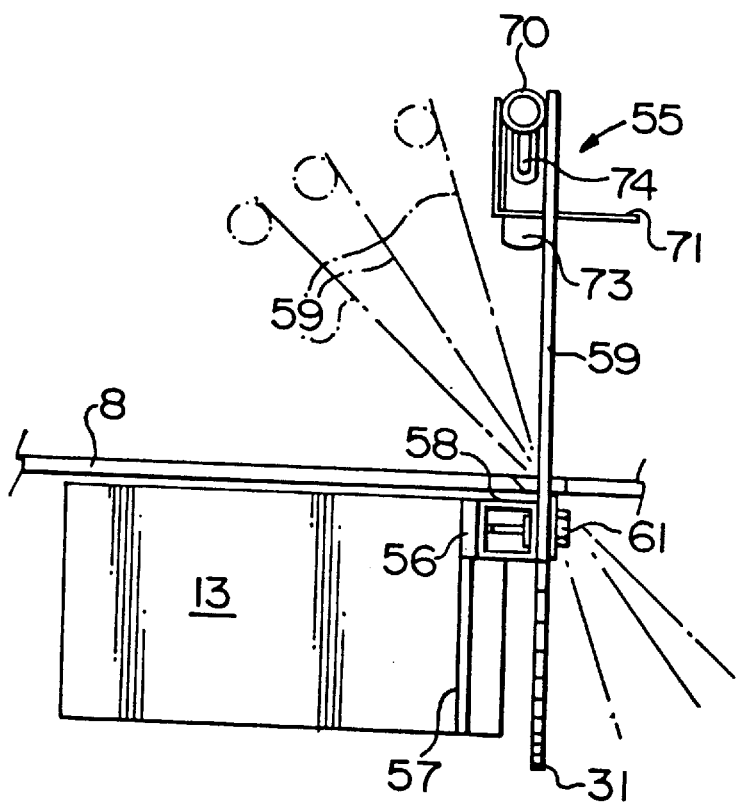
FIG. 7 is an end view of the handle assembly of FIG. 6, as seen from the left thereof.
Figure 8:
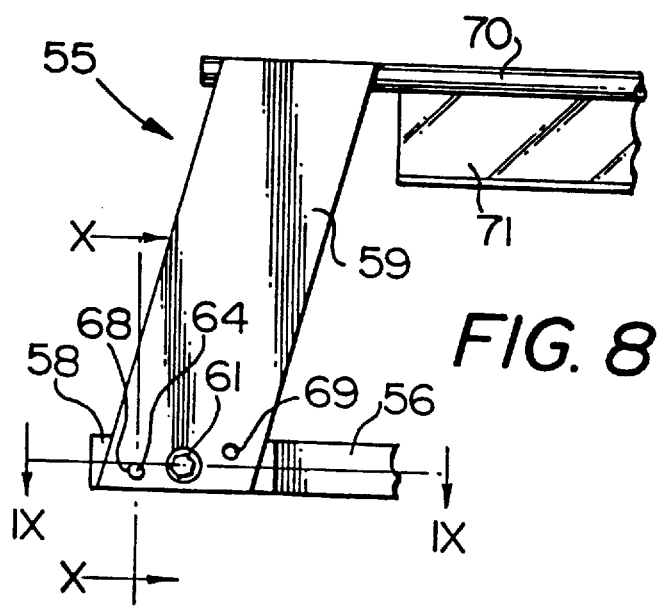
FIG. 8 is a side view of one end of the handle assembly of FIG. 6.

The saw 13 is connected to the slide 21 for movement therewith, whereby the angular position of the blade 31 extending through the slot 9 can be changed. Thus, the saw 13 can be used to make a straight or angled cuts. Referring to FIGS. 3 to 5, the saw 13 is connected to the slide 21 by means of a pair of arms 32 extending between a box 33 on the slide 21 and a bracket 35 on the saw 13. Sleeves 36 are provided on the ends of the arms 32 for receiving pins 37, which pivotally connect the saw to the slide 21. At one end, the pins 37 extend between the sides 39 of the box 33, and at the other end the pins 37 extend between the sides 40 of the bracket 35. A pair of L-shaped plates 42 are connected to the bottom arm 32 and extend out of the box 33. A sleeve 45 is mounted between the plates 42 for rotatably supporting an elongated bolt 46. A wheel 48 with a knob 49 thereon is provided on the outer end of the bolt 46 for rotating the latter. The bolt 46 extends inwardly through a nut 51, which is mounted in a bracket defined by a pair of plates 52 extending upwardly from the base 54 of the box 33. Rotation of the bolt 46 causes a corresponding movement of the plates 42 and consequently of the arms 32 to raise or lower the saw 13. Raising or lowering of the saw 13 moves the blade 31 upwardly and downwardly, i.e. changes the depth of the cut of the blade 31.

Figure 9:
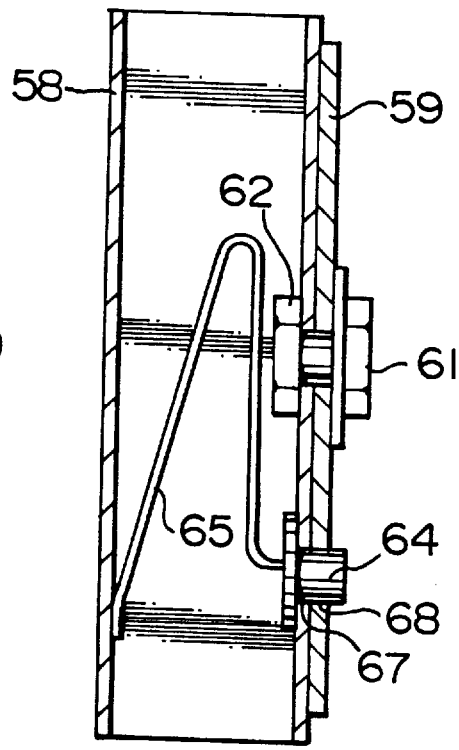
FIG. 9 is a cross section taken generally along line IX—IX of FIG. 8.
Figure 10:
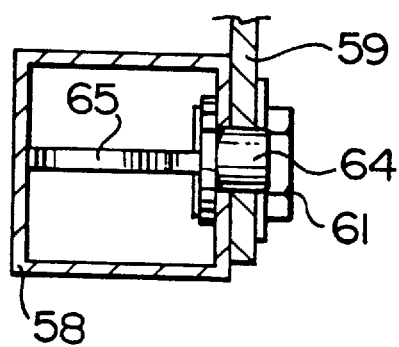
FIG. 10 is a cross section taken generally along line X—X of FIG. 8.

When the saw 13 is to be moved longitudinally of the table top 8, the saw is moved, i.e. caused to slide with the carriage 12 on the rails 10 by a handle assembly generally indicated at 55. As best shown in FIGS. 1, 2 and 6 to 10, the handle assembly 55 includes an arm 56 extending outwardly from the side of the saw 13 opposite the bracket 35 and the arms 32. A reinforcing gusset 57 extends between the arm 56 and the saw casing. A short, square cross section tube 58 is mounted on the outer free end of the arm 56. An inclined splitter plate or arm 59 extends upwardly and forwardly from the tube 58 toward and above the blade 31. The arm 59 is pivotally connected to the tube 58 by a bolt 61 and a nut 62 (FIG. 9). The arm 59 is retained in one of two positions above or below the table top 8 (FIG. 2) by means of a pin 64 which is mounted in the outer end of the tube 58. A leaf spring 65 biases the pin 64 outwardly through a hole 67 in the tube 58. By depressing the pin 64, the arm 59 is released for rotation around the longitudinal axis of the bolt. A pair of openings 68 and 69 are provided in the bottom end of the arm 59 on opposite sides of the bolt 61. In the elevated position of the arm assembly 55 shown in solid outline in FIG. 2, the pin 64 extends through the opening 68 to retain the arm assembly in such elevated position. When the pin 64 is depressed to release the arm 59, the latter can be rotated around the axis of the bolt 61 to the position shown in phantom outline in FIG. 2. When the arm 59 reaches the lowermost position beneath the table top 8, the pin 64 enters the opening 69 to releasably lock the arm 59 in the lower position. A tubular arm extends forwardly from the top end of the arm 59 over the saw blade 31. A transparent plastic visor 71 is provided on the arm 70 for protecting the eyes of the saw operator. A handle 73 and a trigger 74 are mounted on the outer free end of the arm 70 for manual actuation of the saw 13 and longitudinal movement of the carriage 12 and the saw 13 along the table.

From the foregoing, it will be appreciated that the saw 13 can be fixed in one position for use of the assembly as an ordinary table saw, or slide longitudinally of the table. The blade 31 can be inclined for making angled cuts.

What I claim is:

1. A table saw assembly for use with a circular saw comprising a frame; a table top fixed on said frame having a longitudinally extending slot therethrough; rails mounted on said frame beneath and separate from said table top, said rails extending longitudinally of said frame parallel to said slot; a carriage slidable longitudinally on said rails; a saw mounted on said carriage, said saw having a blade extending upwardly through the slot in said table top; a stop for fixing said carriage on said rails; and a control arm pivotally connected to the saw for movement through said slot between a first position in which said control arm is completely beneath said table top, whereby the saw can be used as a table saw, and a second position in which said control arm extends through the slot in said table top above the blade for manually reciprocating the saw and carriage horizontally, whereby the saw can be used as a travelling miter saw.

2. A saw assembly according to claim 1, including a lock for releasably locking said control arm in the first and second positions.

3. A saw assembly according to claim 2, wherein said lock includes a first hole in said control arm; a second hole in said control arm spaced apart from said first hole; and a pin on said carriage adapted to extend through one said first and second holes for locking said control arm in said first or second position.

4. A saw assembly according to claim 3, including a spring biasing said pin outwardly from said carriage for releasable engagement with said first or second hole.

5. A saw assembly according to claim 1, wherein said control arm includes a splitter arm for positioning to the rear of the saw blade when the control arm is in the second position above said table top, the width of the splitter arm being equal to or less than the width of the saw blade, and a handle extending from the outer end of said splitter arm to a position generally above and in front of the saw blade.

6. A saw assembly according to claim 5 wherein said handle is offset laterally from said splitter arm and said handle includes a clear protective shield for positioning above the saw blade when the control arm is in the second position to enable an operator to view the blade while cutting.

7. A saw assembly according to claim 1, wherein said carriage includes a track extending transversely of said frame; and a slide for carrying the saw, said slide being movable on said track for changing the angular position of the saw blade, whereby straight or angled cuts can be made.

8. A saw assembly according to claim 7, wherein said track is arcuate, whereby movement of said slide along said track results in a change in the angular position of the saw blade.

9. A saw assembly according to claim 8, wherein said slide includes arms for pivotally mounting the saw on said slide, whereby the amount of blade extending through the slot can be adjusted for varying the depth of cut.

10. A saw assembly according to claim 9, including adjustment means for pivoting said arm and retaining the arm in a fixed position.

* * * * *